United States Patent [19]
Oda et al.

[11] Patent Number: 5,204,662
[45] Date of Patent: Apr. 20, 1993

[54] MONITOR TELEVISION APPARATUS

[75] Inventors: Osamu Oda, Saitama; Toshio Amano, Kanagawa, both of Japan

[73] Assignee: Sony Corporation, Tokyo, Japan

[21] Appl. No.: 700,865

[22] Filed: May 16, 1991

[30] Foreign Application Priority Data

May 16, 1990 [JP] Japan .................... 2-124239

[51] Int. Cl.⁵ .................... G05B 19/04; H04N 5/44
[52] U.S. Cl. .................... 340/825.25; 340/825.15; 340/825.22; 340/825.24; 358/181; 358/194.1
[58] Field of Search .................. 340/825.25, 825.03, 340/825.15, 825.22, 825.24; 358/181, 194.1; 307/38, 112, 115; 455/179.1, 184.1, 185.1, 186.1

[56] References Cited

U.S. PATENT DOCUMENTS

| | | | |
|---|---|---|---|
| 4,996,597 | 2/1991 | Duffield | 358/194.1 |
| 5,034,819 | 7/1991 | Tsukagoshi | 358/194.1 |
| 5,081,534 | 1/1992 | Geiger et al. | 358/194.1 |

*Primary Examiner*—Donald J. Yusko
*Assistant Examiner*—Andrew Hill
*Attorney, Agent, or Firm*—Lewis H. Eslinger; Jay H. Maioli

[57] ABSTRACT

A monitor television apparatus equipped with a plurality of input terminals for AV signals and adapted to serve as an output apparatus selectively for a plurality of AV appliances by switching the input terminals, wherein command signals for the AV appliances connected to the input terminals are registered together with input terminal data corresponding thereto. And when any registered command signal is detected, the input terminal switching operation is controlled automatically to produce an output signal from the AV appliance corresponding to the detected command signal. Meanwhile, even when the detected command signal is not any of the registered ones, the relevant input terminals are automatically selected if the detected signal is included in the group stored previously in the memory means and at least one of such grouped command signals is registered correspondingly to the input terminals, hence achieving remarkable enhancement in the handling facility while realizing high efficiency in the manipulation for registration.

1 Claim, 7 Drawing Sheets

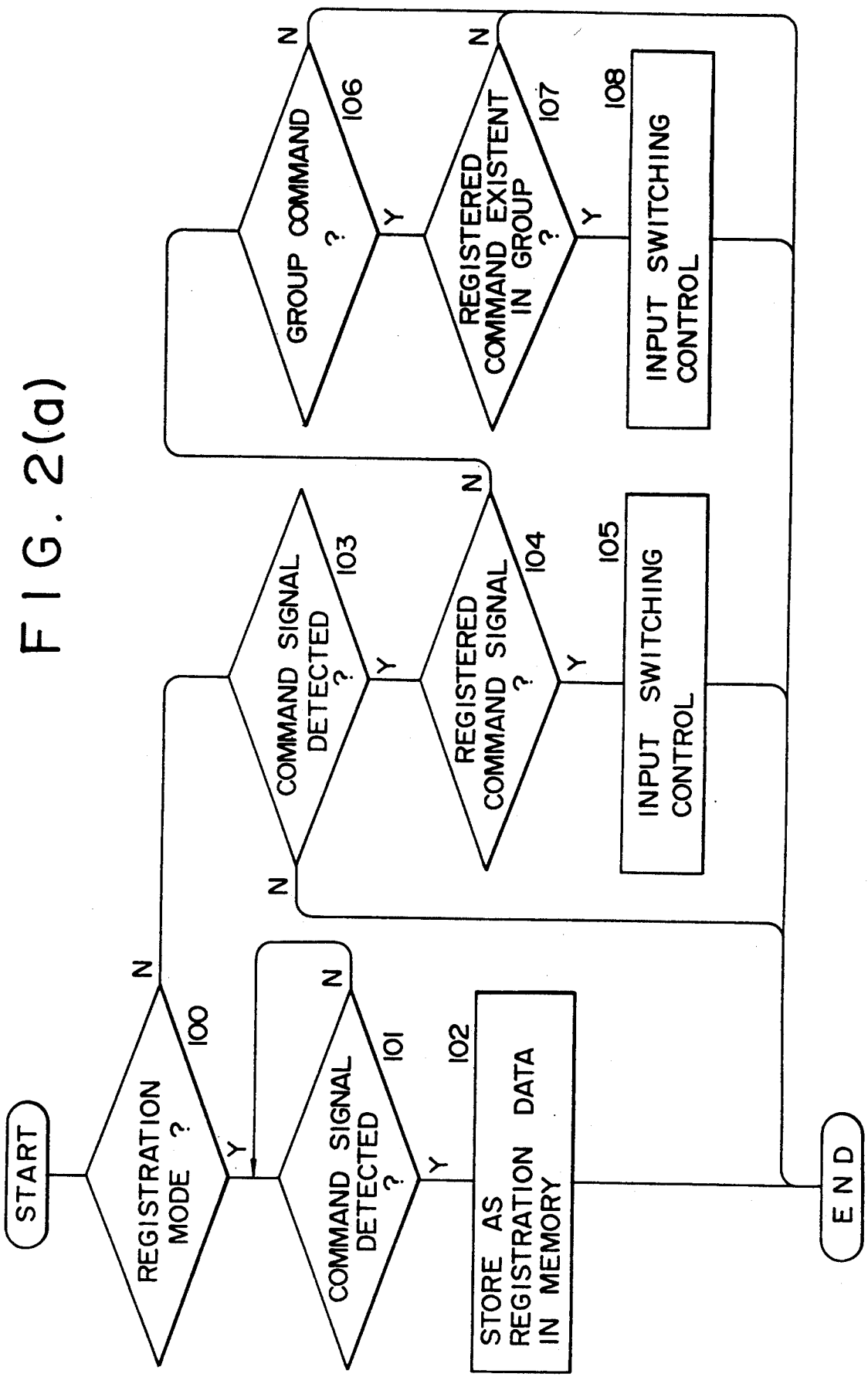

FIG. 3

| COMMAND SIGNAL | | SELECTED INPUT TERMINALS |
|---|---|---|
| CATEGORY DATA | COMMAND DATA | |
| VTR (I) | : PLAY | $T_{a5}, T_{b5}$ |
| VTR (II) | : PLAY | $T_{a4}, T_{b4}$ |
| TV TUNER | : ON | $T_{a1}, T_{b1}$ |
| BS TUNER | : ON | $T_{a2}, T_{b2}$ |
| LASER DISK | : PLAY | $T_{a3}, T_{b3}$ |

| FIG. 4(a) | FIG. 4(b) |

MONITOR TELEVISION APPARATUS

BACKGROUND OF THE INVENTION

1. Field of the Invention

The present invention relates to a monitor television apparatus equipped with a plurality of input terminals and adapted to be used as an output apparatus for a plurality of audio/visual appliances (hereinafter referred to as AV appliances).

2. Description of the Prior Art

FIG. 4 is a block diagram of an exemplary monitor television apparatus having a plurality of input terminals so as to be usable as an output apparatus for various external AV appliances.

In this diagram, a section enclosed with a one-dot chained line denotes a monitor television apparatus 1 where a TV tuner 2 is incorporated, and the apparatus 1 functions by itself as a television broadcast receiver. There are also shown a video signal processing circuit 3, a CRT (cathode-ray tube) display 4, an audio signal processing circuit 5, and loudspeakers 6.

Denoted by reference numeral 7 is a system controller consisting of a microcomputer which is capable of executing a variety of control actions including selection of channels, adjustment of a sound volume, control of image effect and so forth in accordance with command signals output from a remote commander RC of the monitor television apparatus 1 and detected by an infrared sensor 8, or in accordance with command signals obtained from control keys provided in the monitor television apparatus 1. Reference numeral 9 denotes a memory for storing data required to perform the control operations of the system controller 7.

There are further shown a video signal input terminal assembly Ta and an audio signal input terminal assembly Tb to which signals obtained from external AV appliances are selectively inputted in addition to the output signal from the TV tuner 2. Furthermore a VTR (I) 11, a VTR (II) 12, a laser disk 13 and a BS (broadcast via satellite) tuner 14 are connected respectively to input terminals Ta2–Ta5 and Tb2–Tb5 as shown in FIG. 4. An input switching operation is controlled in accordance with a command signal obtained through the system controller 7 from a remote commander RC or a control key manipulated by a user. And the signals to be supplied to the video signal processing circuit 3 and the audio signal processing circuit 5 are selected in the input terminal assemblies Ta and Tb by such input switching operation.

An AV system can be constituted with facility by connecting a plurality of AV appliances to the above-described monitor television apparatus adapted for multiple inputs. However, there exists a problem that, due to the connection of external AV appliances, it becomes necessary to selectively determine the input switching operation depending on which of the AV appliances is used, thereby complicating the manipulation.

For example, when a satellite broadcast is to be selected in the constitution of FIG. 4 where external AV appliances are connected as mentioned, it is necessary to perform, in addition to switching on the BS tuner 14, an operation of connecting the input terminals Ta2 and Tb2 in the input terminal assemblies Ta and Tb. (Normally the operations of switching the video and audio input terminal assemblies Ta and Tb are mutually linked under control.)

Therefore the user is obliged to grasp the input switching operation with the necessity of an additional manipulation to consequently bring about operational intricacy, and the manipulation is rendered difficult for any user unaccustomed to handling such appliances.

Also in operating the monitor television apparatus by the use of a remote commander RC, since an exclusive remote commander is prepared for each AV appliance, it becomes necessary to use both remote commands for the AV appliance and the monitor television apparatus when utilizing the connected AV appliance, hence further complicating the manipulation.

OBJECT AND SUMMARY OF THE INVENTION

It is therefore an object of the present invention to provide an improved monitor television apparatus designed for remarkably enhancing the operational facility while promoting the handling convenience in an audio/visual system. For the purpose of achieving the object mentioned, command signals for AV appliances connected to input terminals are registered together with the input terminals, and when any of the registered command signals is detected, the input terminals are automatically switched in such a manner that a signal is outputted from the AV appliance corresponding to the detected command signal. And even when any nonregistered command signal is detected, the relevant input terminals can be automatically selected if such command signal is included in the grouped command signals stored previously in a memory means and at least one of the command signals in the group is registered correspondingly to the input terminals as mentioned.

According to one aspect of the present invention, there is provided a monitor television apparatus which is equipped with a plurality of input terminals for audio/visual signals and is adapted to function as an output apparatus selectively for a plurality of audio/visual appliances by switching the input terminals. The monitor television apparatus comprises a command signal detection means for detecting command signals to the audio/visual appliances connected to the input terminals and identifying the contents of the commands; a memory means for storing command signals relative to the audio/visual appliances and also input terminals, to which the audio/visual appliances are connected, in a mutually corresponding relation, and further storing a group of specific command signals previously; a selected-input detection means for detecting the selected input terminals in accordance with the input terminal switching operation; a registration control means for storing the detected command signals in the memory means correspondingly to the input terminals detected by the selected-input detection means; and input selection control means wherein, when any command signal registered in the memory means by the registration control means is detected by the command signal detection means, the input terminals, to which the audio/visual appliance corresponding to the detected command signal is connected, are grasped by reading out the registered data from the memory means. And even when any command signal not registered in the memory means by the registration control means is detected, if at least one of the command signals previously stored in the memory means is of the same group as the detected command signal that was previously the input selection control means controls the input terminal switching operation in a manner to select the relevant input terminals.

The above and other features and advantages of the present invention will become apparent from the following description which will be given with reference to the illustrative accompanying drawings.

DESCRIPTION OF THE DRAWINGS

FIG. 1 is a block diagram of a monitor television apparatus embodying the present invention;

FIGS. 2(a) and 2(b) are flow charts for explaining the operation of the embodiment shown in FIG. 1;

FIG. 3 shows an exemplary format of registration in a memory; and

DESCRIPTION OF THE PREFERRED EMBODIMENT

Hereinafter the monitor television apparatus of the present invention will be described in detail with reference to a preferred embodiment shown in the accompanying drawings.

Figures 4, 4A:
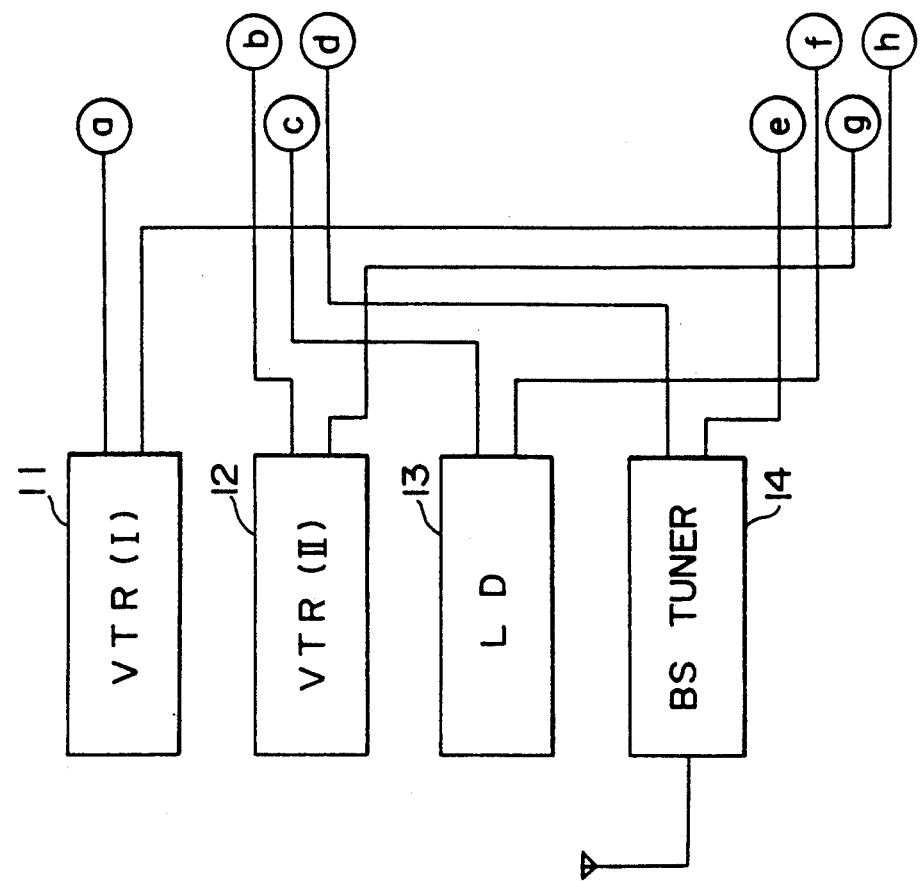
FIGS. 4(a) and 4(b) constitute an explanatory schematic block diagram designated FIG. 4 of a monitor apparatus equipped with a plurality of input terminals.
FIG. 4 is a block diagram of a monitor television apparatus equipped with a plurality of input terminals.
Figure 4B:
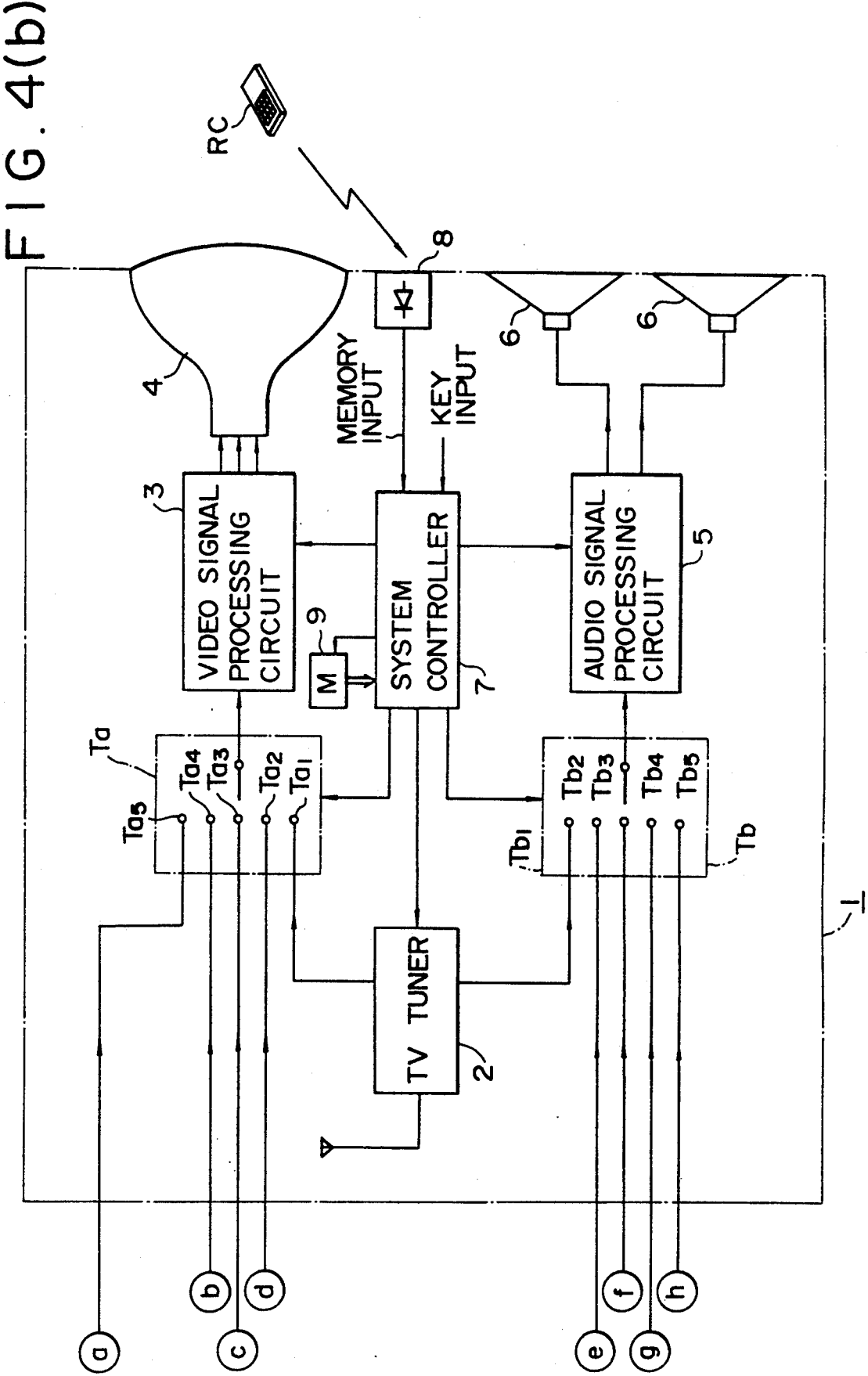

FIG. 1 is a block diagram of such exemplary embodiment, wherein an internal TV tuner, a BS tuner, a laser disk, a VTR (II) and a VTR (I) are connected respectively to input terminals Ta1-Ta5 and Tb1-Tb5 in input terminal assemblies Ta and Tb as in the aforementioned example of FIG. 4 so as to supply video and audio signals. The video and audio signals obtained from the AV appliance connected to the input terminals selected by an input switching operation are fed to a video signal processing circuit and an audio signal processing circuit respectively as in the example of FIG. 4, and then are outputted from a CRT screen or a loudspeaker.

Denoted by 20 is a system controller consisting of a microcomputer with various operation control means (not shown) corresponding to operation command signals for the monitor television apparatus, as in the aforementioned system controller 7 shown in FIG. 4. The system controller 20 further has the following functional elements 21 through 24 which serve as software means. In the drawing, an interface typically disposed between the microcomputer and other circuits is omitted.

Reference numeral 21 denotes a command signal detection means for detecting, on the basis of an registration command signals for the AV appliances connected to the input terminal assemblies Ta, Tb and discriminating the contents of such commands.

Denoted by 22 is a selected-input detection means 22 for detection which of the input terminals is selected in the input terminal assemblies Ta, Tb.

Reference numeral 23 denotes a registration control means which functions in a registration mode obtained in response to a mode signal $S_M$ incutted with manipulation by a user and stores a command signal, relative to the connected AV appliance detected by the command signal detection means 21, in a memory 30 corresponding to the input terminals detected by the selected-input detection means 22.

Denoted by 24 is an input selection control means. In an automatic switching mode obtained in response to a mode signal $S_M$, when a command signal registered already by the registration control means 23 is detected by the command signal detection means 21, the input selection control means 24 reads out from the memory 30 the data of the input terminals stored correspondingly to the detected command signal and then controls the input switching operation in the input terminal assemblies Ta, Tb in a manner to select the relevant input terminals. Even when a non-registered command signal is detected, if the corresponding input terminals can be identified by a group search which will be described later, the input selection control means 24 also serves to control the input switching operation in the input terminal assemblies Ta, Tb in a manner to select the relevant input terminals.

Denoted by 30 is a memory where the data is written or read out under control action of the system controller 20. The memory 30 has a registration area 30a for storing the command signals registered by the registration control means 23 relative to the connected AV appliances and also the data relative to the corresponding input terminals. The operation of such registration will be described later.

The memory 30 further has a group storage area 30b where grouped command signals for automatically selecting the same input terminals in the input terminal assemblies Ta, Tb are previously held. For example, relative to the BS tuner connected to the input terminals Ta2 and Tb2, a command signal "BS : ON" and channel switching commands "BS : ch-1", "BS : ch-3", "BS : ch-5", "BS : ch-7", "BS : ch-9", "BS : ch-11", "BS : ch-15". "BS : ch-UP" and "BS : ch-DOWN" are stored as one group.

The data required for command manipulations of the monitor television apparatus, i.e., for fundamental manipulation control including switchover of channels, adjustment of sound volume and so forth, are stored in an unshown memory means composed of a ROM.

Denoted by 40 is an infrared sensor for receiving and sensing an infrared command signal outputted from any of various remote commanders RC, RC . . . and so forth. The infrared command signal detected by the infrared sensor 40 (inclusive of any command signal relative to the connected AV appliance in addition to the command signal for the monitor television apparatus) is amplified by an amplifier circuit 41 and then is supplied to the command signal detection means 21.

The command signals relative to the connected AV appliances and supplied to the command signal detection means 21 are not limited to those outputted from the remote commanders RC, RC . . . and so forth, and any command signal generated by manipulation of an input key in the connected AV appliance can be detected, with the provision of a bus communication channel or the like, by the command signal detection means 21 via a wired circuit.

Now the operation of the monitor television apparatus in this embodiment will be described below with reference to a flow chart of FIG. 2(a).

In the initial stage of the use, it is necessary to perform a registration operation for execution of the input switching control described below. First the operation of such registration [steps 100-102] will be explained. It is supposed here that ten kinds of command signals such as "BS : ON", "BS : ch-1", . . . "BS : ch-DOWN" relative to the BS tuner are grouped and stored previously in the group storage area 30b of the memory 30.

In the procedure of executing such registration, first the system controller 20 is placed in a registration mode by a mode signal $S_M$, and then a desired command signal to be registered is inputted after the input terminal assemblies Ta and Tb are switched selectively to the input terminals for the AV appliance to which such command signal is related.

As for the operation of the system controller 20 performed in this stage, when the command signal to be registered (such as "VTR (I) : PLAY" relative to the connected AV appliance) is detected by the signal detection means 21 in the registration mode [steps 100 and 101], then the registration control means 23 functions to store the command signal [step 102] in the registration area 30a of the memory 30 corresponding to the selected input terminals (detected by the selected-input detection means 22).

Due to such registration, the system controller 20 is rendered capable of grasping the command signal and the input terminals relative to the connected AV appliance.

FIG. 3 shows an exemplary registration format of the data stored in the registration area 30a of the memory 30 according to the procedure of step 102.

Each command signal outputted from the remote commander is normally composed of category data and command data. The AV appliance corresponding to such command signal is identified by the category data, and the content of the manipulation is identified by the command data.

Therefore, the data registered in the memory 30 by the above operation are arranged in a predetermined format where, for example, the category data having contents of "VTR (I)", "BS tuner" and so forth are stored together with the command data having manipulation contents of "PLAY", "ON" and so forth, and further the input terminal data (e.g., Ta5, Tb5) relative to the AV appliance corresponding to such category data are also stored.

A registration is performed in response to a desired command signal of FIG. 3 with exception of steps 100 through 102 shown in the flow chart of FIG. 2(a), whereby it is rendered possible to achieve the input selection control according to the procedure of steps 103 through 108.

Upon detection of a command signal [step 103] by the command signal detection means 21 during the automatic switching mode of the system controller 20 switched in response to a mode signal $S_M$, a decision is made as to whether the detected command signal is one registered already in the memory 30 [step 104]. And if the result of such decision is affirmative, a switching operation is performed by the input selection control means 24 as to select the relevant input terminals in the input terminal assemblies Ta and Tb [step 105]. For example, when a command signal "VTR (I) : PLAY" in the registration format of FIG. 3 is inputted, the registered input terminals Ta5 and Tb5 are selected under control, so that a reproduced picture supplied from the VTR (I) is displayed on the monitor television apparatus.

In case the detected command signal is not any of the registered ones, the group storage area 30b of the memory 30 is searched, and then a decision is made as to whether the detected command signal is any one of the grouped preset signals [step 106]. And if the group including such command signal was previously stored, another decision is made [step 107] as to whether the command signal registered in the registration area 30a by the procedure of steps 101 and 102 is existent or not in the group. In case the result of such decision is affirmative, the input terminal assemblies Ta and Tb are switched under control by the input selection control means 24 in a manner to select the input terminals relative to such registration [step 108].

Suppose now that, for example, a command signal "BS : ch-5" for selecting the channel 5 of the BS tuner is detected in a condition where command signals and input terminal data are previously registered in the registration area 30a of the memory 30 as shown in FIG. 3. Since the signal "BS : ch-5" is not any of the command signals registered together with the corresponding input terminals, the input selection control means 24 is not capable of grasping which input terminals are to be switched and selected under control. However, in the group storage area 30b, "BS : ch-5" would be stored in the same group as "BS : ON", "BS : ch-1" and so forth as mentioned, and in such group, "BS : ON" is already registered corresponding to the input terminals Ta2, Tb2.

In this case, the input selection control means 24 executes a selective switching control in a state where the input terminals Ta2, Tb2 corresponding to the signal "BS : ON" are regarded as input terminals corresponding to the input command signal "BS : ch-5". A similar operation is performed with regard to the other command signals such as "BS : ch-7", "BS : ch-11" and so forth in the same group.

In this embodiment of the monitor television apparatus, the processing routine shown in the flow chart is executed by the system controller 20, so that the input switching control of the monitor television apparatus is performed simultaneously in response to the command signal for any of the connected AV appliances, thereby facilitating the manipulation of the monitor television apparatus. Furthermore, various command signals relative to the BS tuner for example are grouped and stored in advance, so that if any one of such command signals is registered correspondingly to the input terminals, it becomes possible to execute a switching control of the input terminals in response to any other command signal included in the same group, whereby a registration of each command signal is rendered unnecessary.

The above embodiment represents an exemplary case where 10 kinds of command signals relative to the BS tuner are grouped. And it is possible to simultaneously group command signals such as "TV : ON", "TV : ch-1", "TV : ch-3", . . . "TV : ch-DOWN" for the TV tuner and to hold the signals in the group storage area 30b. In addition, signals "VTR (I) : ON", "VTR (I) : PLAY", "VTR (I) : REC" and so forth may also be grouped relative to the VTR (I).

If a function of group registration is additionally provided in the registration control means 23, group setting by the user is rendered possible.

Figure 1A:
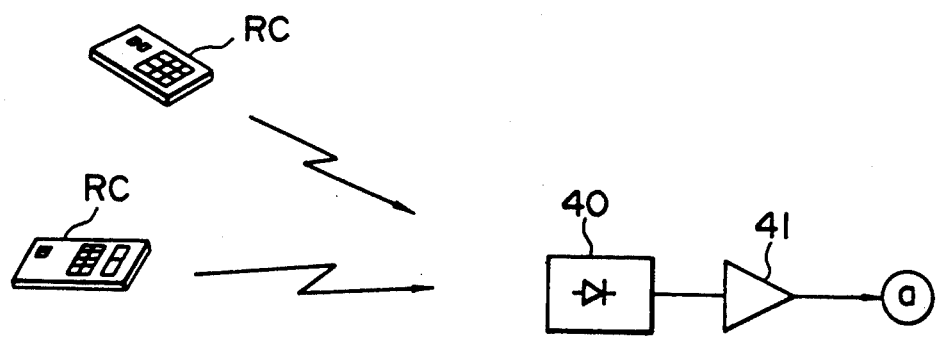
FIGS. 1(a) and 1(b) constitute a schematic block diagram designated FIG. 1 of a monitor apparatus embodying the present invention.
Figure 1A:
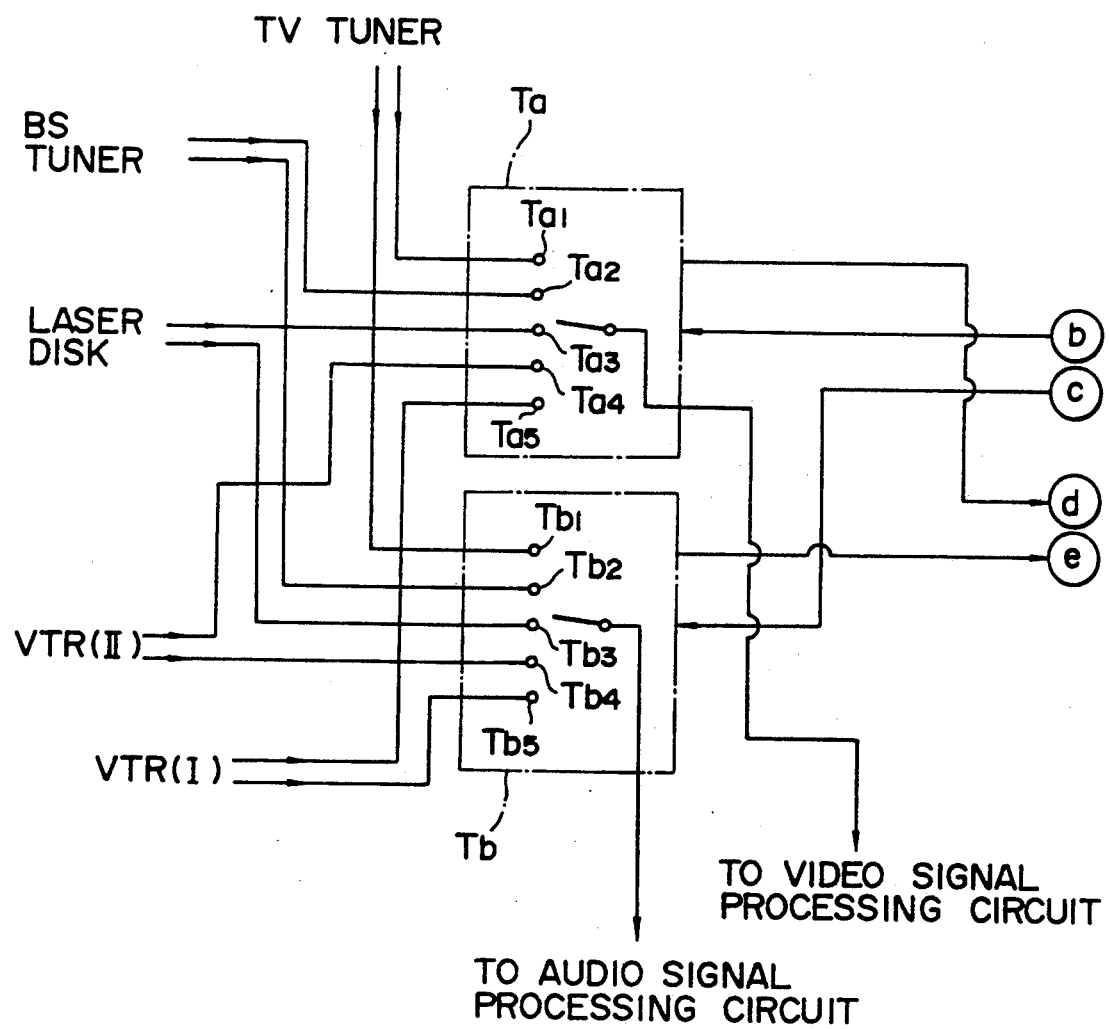
Figure 1B:
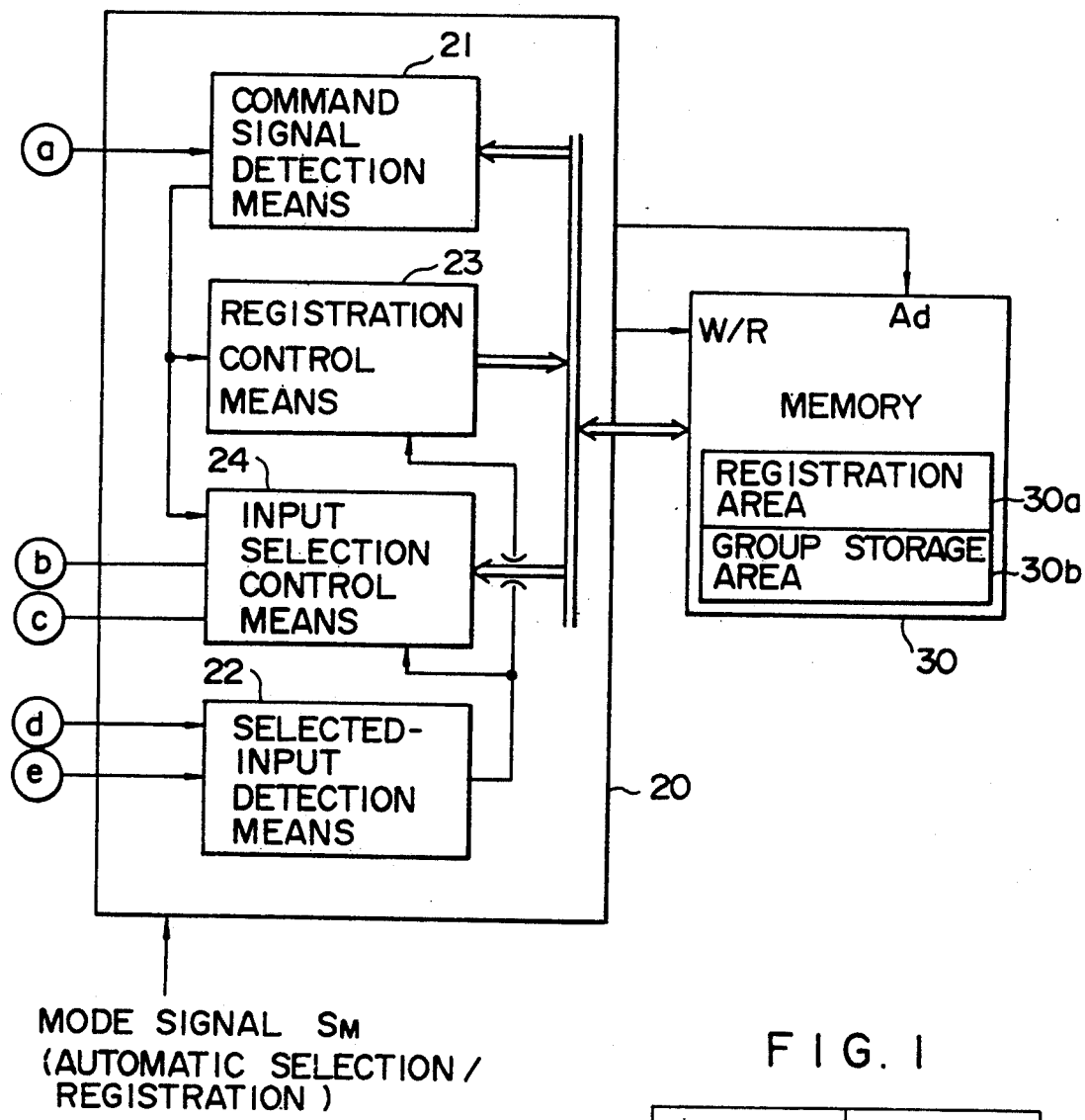
Figure 1B:
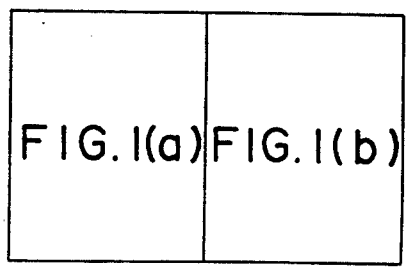
Figure 2B:
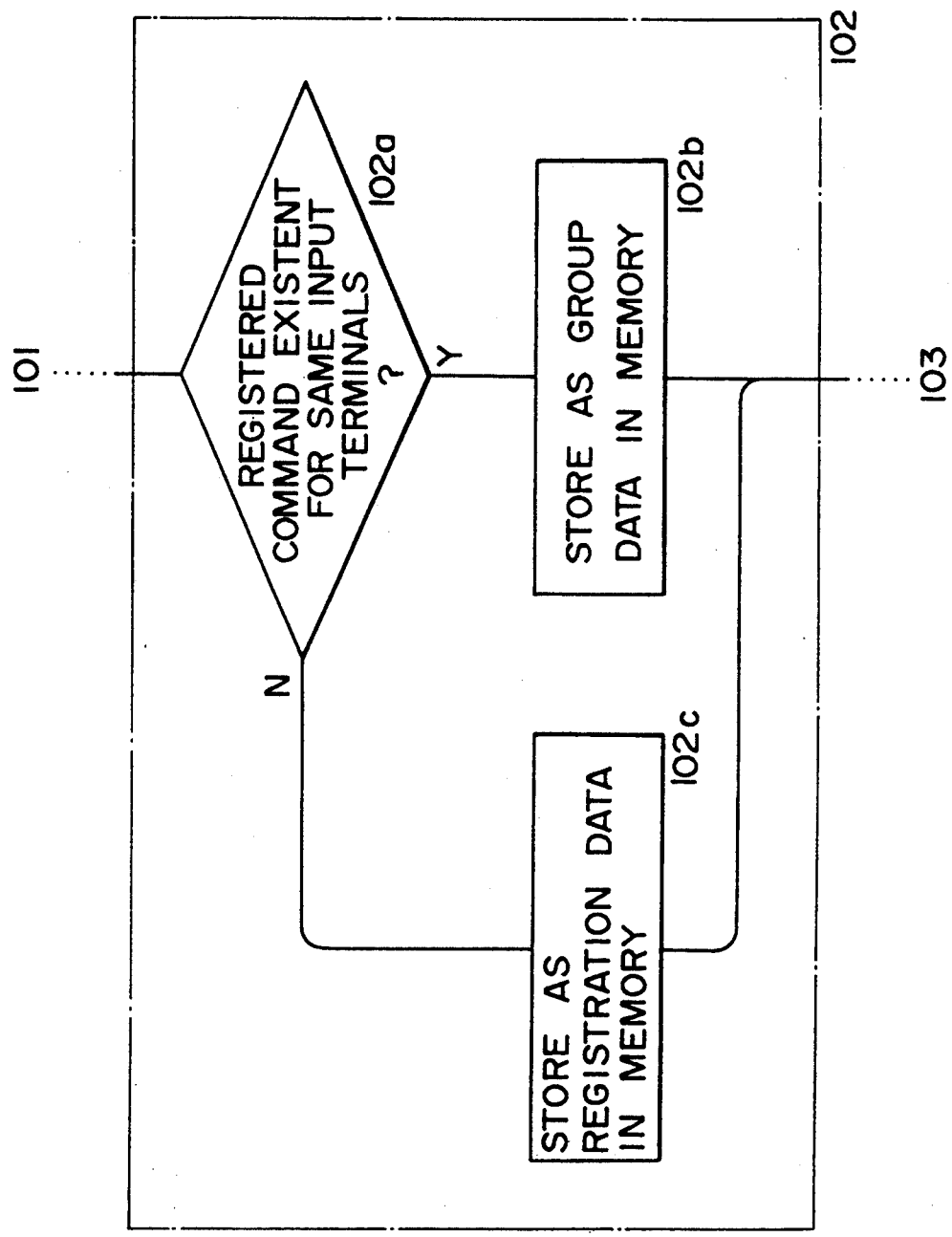

In this case, the operation shown in FIG. 2(b) is performed by the procedure of step 102 in the flow chart of FIG. 2 (a).

More specifically, upon detection of the command signal in the registration mode, a search is executed to find whether any registered command signal corresponding to the selected input terminals is existent or not [step 102a]. And if the result of such search is affirmative to indicate the existence, both the registered command signal and the input command signal are stored as one group in the group storage area [step 102b]. Meanwhile, in case any registered command signal corresponding to the selected input terminals is not existent, the detected command signal is registered directly in the registration area 30a corresponding to the input terminals presently selected [step 102c].

Thus, the user is enabled to perform group setting as well to consequently attain flexible compliance with the requirements of modifying the system or enhancing the system capability.

As described hereinabove, the monitor television apparatus of the present invention is so contrived as to detect a command signal relative to the connected AV appliance in addition to a command signal for the apparatus itself, wherein, if the detected command signal is one already registered, a control action is executed to automatically select the input terminals for the relevant AV appliance. And even when the detected signal is not any of the registered command signals, if at least one of the preset signals grouped to be the same as the detected command signal is already registered, then a control action is so executed as to select the registered input terminals. Therefore, during normal use, the user need not switch the input terminals of the monitor television apparatus manually with another advantage of achieving remarkable facility and high efficiency in the manipulation for registration, hence attaining great enhancement in the handling convenience of the monitor television apparatus employed in an AV system. Furthermore, the apparatus of the present invention is particularly useful when a receiving channel selector such as a BS tuner is connected thereto.

What is claimed is:

1. A monitor television apparatus equipped with a plurality of input terminals for audio/visual signals and adapted to serve as an output apparatus electively for a plurality of audio/visual appliances by switching the input terminals, said apparatus comprising:

command signal detection means for detecting command signals relative to the audio/visual appliances connected to said input terminals and identifying the contents of the commands;

memory means for storing in a registration area command signals relative to certain audio/visual appliances and data of input terminals, to which said audio/visual appliances are connected, in a mutually corresponding relation, and further for storing in a group storage area of said memory means a plurality of specific command signals previously detected by said command signal detection means;

selected-input detection means for detecting the input terminals selected in accordance with the input terminal switching operation;

registration control means for storing the command signals detected by said command signal detection means and data corresponding to the input terminals detected by said selected-input detection means in said memory means; and input selection control means for controlling said switching of the input terminals, so that when any command signal already registered in said memory means by said registration control means is detected by said command signal detection means the input terminals to which the audio/visual appliance corresponding to the detected command signal is connected are grasped by reading out the registered data from said registration area of memory means and the input terminal switching operation is so controlled as to select the relevant input terminals, and when a command signal not registered in said registration area of said memory means by said registration control means is detected if at least one of the command signals was previously registered in said group storage area of said memory means by said registration control means the input terminal switching operation is controlled to select the relevant input terminals in response to said previously registered command signals.

* * * * *

UNITED STATES PATENT AND TRADEMARK OFFICE
CERTIFICATE OF CORRECTION

PATENT NO. : 5,204,662
DATED : April 20, 1993
INVENTOR(S) : Osamu Oda and Toshio Amano It is certified that error appears in the above-indentified patent and that said Letters Patent is hereby corrected as shown below:

Col. 3, line 51, delete "an"
       line 56, change "detection" to --detecting--
       line 60, change "incutted" to --inputted--

Signed and Sealed this

Twenty-third Day of August, 1994

Attest:

BRUCE LEHMAN

Attesting Officer

Commissioner of Patents and Trademarks